United States Patent
Schmidt et al.

(10) Patent No.: US 10,204,072 B2
(45) Date of Patent: Feb. 12, 2019

(54) METHOD FOR AUTOMATICALLY ALLOCATING ADDRESSES TO SIMILAR BUS USERS

(75) Inventors: Ralph Schmidt, Bietigheim-Bissingen (DE); Eko-Bono Suprijadi, Ludwigsburg (DE); Eckart Schlottmann, Affalterbach (DE); Christian Astor, Schwetzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1509 days.

(21) Appl. No.: 13/876,804

(22) PCT Filed: Sep. 21, 2011

(86) PCT No.: PCT/EP2011/066444
§ 371 (c)(1),
(2), (4) Date: Aug. 7, 2013

(87) PCT Pub. No.: WO2012/041753
PCT Pub. Date: Apr. 5, 2012

(65) Prior Publication Data
US 2013/0326099 A1    Dec. 5, 2013

(30) Foreign Application Priority Data

Sep. 30, 2010   (DE) .................. 10 2010 041 810

(51) Int. Cl.
*G06F 13/40* (2006.01)
*H04L 29/12* (2006.01)
(Continued)

(52) U.S. Cl.
CPC .... *G06F 13/4068* (2013.01); *H04L 29/12254* (2013.01); *H04L 61/2038* (2013.01);
(Continued)

(58) Field of Classification Search
CPC .............................. G06F 13/36; H04L 12/403
(Continued)

(56) References Cited

U.S. PATENT DOCUMENTS

| | | | | |
|---|---|---|---|---|
| 2007/0088885 A1* | 4/2007 | Ellerbrock | ............ | G06F 13/387 710/113 |
| 2007/0173083 A1* | 7/2007 | Kopplin | ................ | H04L 12/403 439/76.1 |
| 2013/0282946 A1* | 10/2013 | Ricci | .................... | G06F 13/4004 710/306 |

FOREIGN PATENT DOCUMENTS

| CN | 101167341 | 4/2008 |
|---|---|---|
| DE | 299 07 265 | 4/1989 |

(Continued)

OTHER PUBLICATIONS

International Search Report for PCT/EP2011/066444, dated Jan. 20, 2012.

*Primary Examiner* — Tim T Vo
*Assistant Examiner* — Kim T Huynh
(74) *Attorney, Agent, or Firm* — Norton Rose Fulbright US LLP; Gerard Messina

(57) ABSTRACT

In a method for allocating addresses in a CAN network having at least one master bus user and at least one slave bus user, the master bus user initiates the address allocation via a query message that is arranged for all bus users. Slave bus users which have already been assigned an address respond to this query message by transmitting a message at their assigned address. Slave bus users which have not yet been assigned an address take measures in response to this query message to be able to transmit on the bus without collisions, and transmit their serial number to the master bus user using these measures. At least the slave bus users which have not yet been assigned an address are assigned a suitable address (Continued)

by the master after receipt of the serial number, and use this address for further communication on the bus.

15 Claims, 4 Drawing Sheets

(51) Int. Cl.
*H04L 12/40* (2006.01)
*H04L 12/403* (2006.01)

(52) U.S. Cl.
CPC .... *H04L 12/40019* (2013.01); *H04L 12/4035* (2013.01); *H04L 2012/40215* (2013.01)

(58) Field of Classification Search
USPC .................. 710/110, 113, 305–306, 100
See application file for complete search history.

(56) References Cited

FOREIGN PATENT DOCUMENTS

| | | |
|---|---|---|
| DE | 197 13 240 | 10/1998 |
| DE | 10 2007 028 387 | 8/2008 |
| EP | 0 893 767 | 1/1999 |
| EP | 2014 062 | 1/2009 |
| JP | 11120118 | 4/1999 |
| WO | WO 2005/051723 | 6/2005 |
| WO | WO 2007/122229 | 11/2007 |

\* cited by examiner

| No. | SRN | ID |
|---|---|---|
| 1 | | |
| 2 | | |
| 3 | | |
| 4 | | |
| ... | | |
| | | |
| | | |

Fig. 4

METHOD FOR AUTOMATICALLY ALLOCATING ADDRESSES TO SIMILAR BUS USERS

BACKGROUND OF THE INVENTION

1. Field of the Invention

The present invention relates to a method for automatically allocating addresses to at least two similar users of a communication bus system by a coordinating master control unit.

2. Description of the Related Art

Recent vehicles are characterized by an increasingly highly networked architecture of control units which are connected to one another by a suitable bus system, and which may exchange data with one another using protocols that are available for this purpose.

A bus system known from the related art is the CAN bus, which is described by the ISO 11898 standard. A characteristic feature of this bus system is that the access to the bus for the individual bus user is granted or not granted within the scope of arbitration, depending on the bus user address. In the event of a simultaneous transmission attempt, bus users with low addresses are given priority over bus users with higher addresses, and may transmit their data frame to the bus, while the bus user with the higher address must start a transmission attempt anew.

Transmission processes for bus systems such as this one make it necessary to carefully select the addresses for each individual control unit in configuring a bus communication for a vehicle. Depending on this selection, the latency time which may be required by a bus user as a function of the bus utilization in order to transmit its data on the bus is longer or shorter, with possible corresponding effects on the vehicle behavior.

In some cases, multiple bus users have the same tasks. For example, multiple sensors, such as for measuring temperatures or voltages or rotational speeds at various points in the vehicle, have similar designs, and their measured data may have a similar priority for the vehicle behavior.

However, communication protocols such as the CAN bus protocol routinely require that these matching bus users have different addresses in order to take part in the communication via the bus. This may result in an increased level of effort for suppliers for providing the differently programmed sensors having correspondingly different part numbers, etc., or also for vehicle manufacturers for programming the sensors at the end of production and/or for the associated logistics system.

In contrast, it would be advantageous to be able to automatically allocate suitable addresses to similar bus users of a network, and to use sensors which are identical except for the serial numbers, for example, having uniform part numbers.

German Utility Model DE 299 07 265 U1 describes a data transmission system having a central configuration control unit which is able to assign suitable addresses to the multiple functional units, which differ only with respect to their serial number, by writing to an address register that is set up for this purpose.

German Patent Specification DE 197 13 240 C2 describes a method for automatically allocating addresses in a CAN network, in which, upon request by a master, the bus users generate an address via a random generator, and based on the data traffic on the bus and based on the bus users' individual success in gaining bus access, subsequently determine whether this address is unique within the bus network or is already allocated. A targeted address allocation or influencing the address allocation by the master, for example with the aim of setting a priority among the bus users, is not provided here.

European Patent Specification EP 2 014 062 B1 discloses a method in which a new user on a data bus derives a temporary address and a transmission time based on the serial number of the data bus, independently reports to the bus with a request message, using both values, and as a response to the request message receives a suitable final address from a coordinating control unit for further use.

The methods known from the related art do not provide satisfactory results in all respects.

BRIEF SUMMARY OF THE INVENTION

The object of the present invention is to provide a method in which similar control units which differ only with respect to their serial number, for example, may be connected to a communication bus without having been assigned different addresses beforehand, and may be assigned addresses by a master control unit in such a way that the master control unit has control over the sequence of the allocation process and the allocated addresses.

The described object is achieved according to the present invention in that the master control unit starts an allocation of the addresses by an arranged instruction, and the slave bus users or slaves respond differently, depending on whether or not they have already been assigned an address. The slaves which have already been assigned an address report at the address assigned to them. The slaves which have not yet been assigned an address communicate their serial number to the master via a suitable communication process which advantageously minimizes the likelihood of message collisions. The master then assigns a suitable address. It may be advantageous for the master to enter the serial number together with the assigned address into a list which the master manages in its memory.

In one preferred specific embodiment, the participating control units are set up for allocating the addresses by suitable programming which in particular assists in carrying out the method according to the present invention via a suitable protocol. This protocol may advantageously be a transport protocol which resides on the CAN protocol, and which is suited for the steps to be carried out, for example the writing to memory areas. Likewise, one preferred aspect is to use services based on a known diagnostic protocol, for example the Unified Diagnostic Services (UDS) standard.

In addition, it is advantageous if, as the result of a suitable programming or configuration, the master knows how many slaves should be connected to the bus in the normal case.

Likewise, it is advantageous if, after recognizing a successful allocation of the addresses to the slaves that are present, the master initiates the normal bus operation.

To allow slave bus users which have not yet been assigned an address to transmit their serial number to the master, it is advantageous if the slave bus users transmit their data to the master at a fixed address at randomly selected points in time. As a result, collisions between the transmitted data are unlikely. It may be practical for the master to specify for the slaves a time range having defined time windows for transmission.

If the method according to the present invention has to be run through multiple times in order to complete the allocation of addresses, it is advantageous to adapt the mentioned time range in each case according to the number of slave bus users which have not yet been assigned an address. The total time required for allocating the addresses may thus be reduced.

Another option is for the slave bus users to use their serial number as an address for transmission. For this purpose, in the case of use of a CAN bus it is practical to switch over to the extended mode of the CAN protocol. If there are still not enough addresses in extended mode to map all serial numbers, the range of the serial numbers may additionally be divided into subranges by suitable masking.

It is also advantageous to initiate error correction for the case that the expected number of slaves does not report to the bus during the allocation process. For example, if too many slaves query an address, a faulty bus configuration may be signaled by a suitable error message. If too few slaves have become active, the method may be iterated, a reset of the slaves may be initiated, or, in particular after a predetermined number of iterations have unsuccessfully been run through, a suitable error message may likewise be triggered.

BRIEF DESCRIPTION OF THE DRAWINGS

FIG. 4 shows one example of the assignment table of the master bus user according to the present invention.

DETAILED DESCRIPTION OF THE INVENTION

Exemplary embodiments of the method according to the present invention and the device are described below. These specific examples are used for explaining the carrying out of the present invention, but do not limit the scope of the inventive concept. In particular, the use of a CAN bus is assumed in the exemplary embodiments. However, the method is transferable to other bus systems having event-driven, address-based access to the bus by the bus users.

Figure 1:
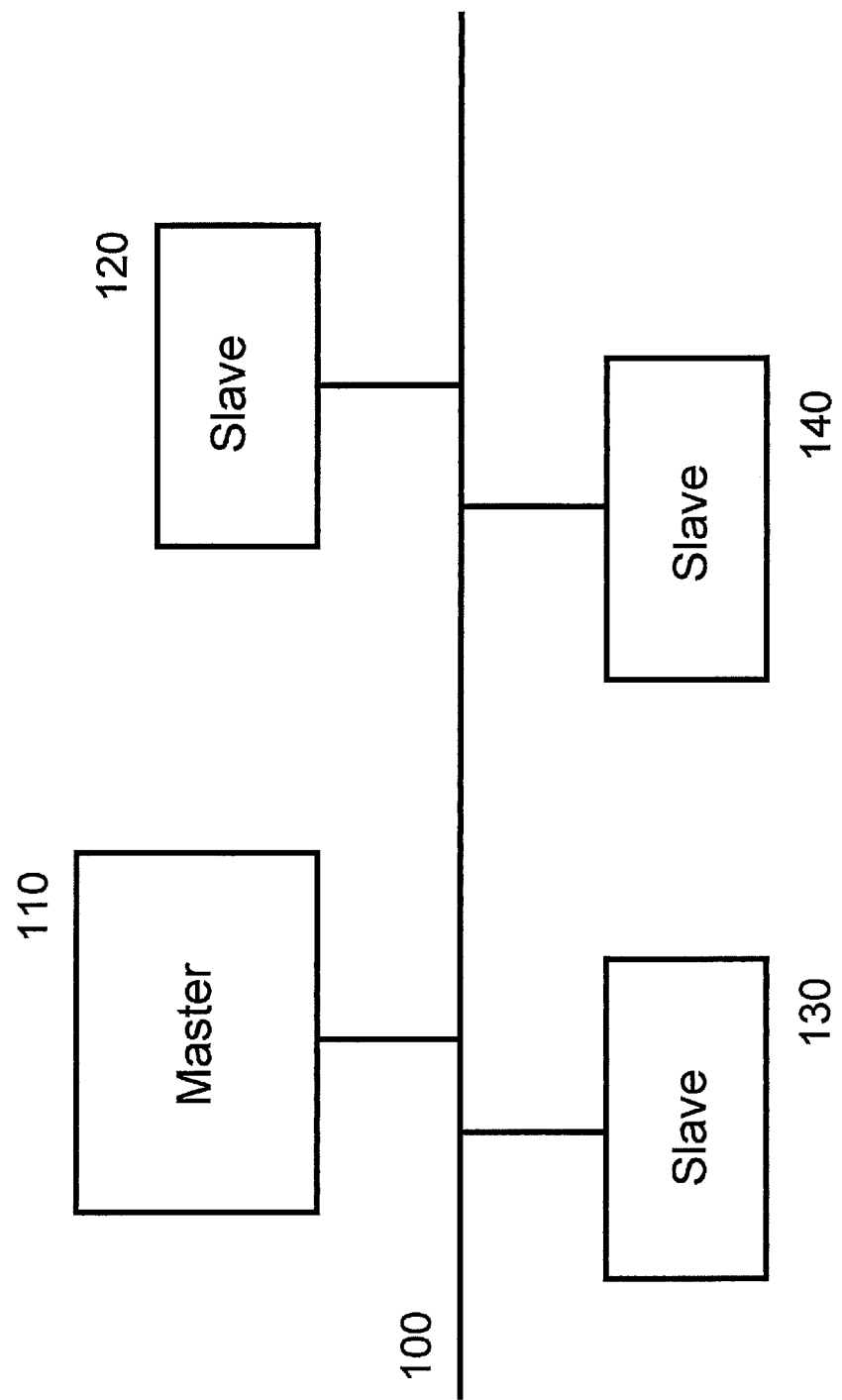
FIG. 1 shows a bus system according to the present invention, having a master bus user and at least two slave bus users which are set up for carrying out the method according to the present invention.

A CAN bus 100 having multiple users 110, 120, 130, 140 as illustrated in FIG. 1 is considered. 110 is a master bus user, and 120, 130, and 140 are slave bus users. In addition, further users may be present on the bus which have valid addresses and do not take part in the allocation process according to the present invention. If such users are present, it must be ensured that these users do not interfere with the method according to the present invention. At the same time, it must be ensured that the method according to the present invention does not cause error conditions or error memory entries. Apart from these aspects, these users play no further role in the method and are not mentioned further herein.

As the first exemplary embodiment, the case is considered that at the start of the method, all slaves differ only with respect to their serial number. Control units 110, 120, 130, 140 in FIG. 1 taking part in the method are set up for the address allocation process by suitable programming which uses the individual services of the Unified Diagnostic Services (UDS) diagnostic protocol in modified form.

The method according to the present invention is explained with reference to the sequence illustrated as a flow chart in FIG. 2.

As the result of a suitable programming or configuration, master bus user 110 knows the number of slaves that are to take part in the communication. In addition, the master bus user maintains a list of serial numbers and addresses, in which it enters which addresses it has assigned to the various slaves.

Figure 2:
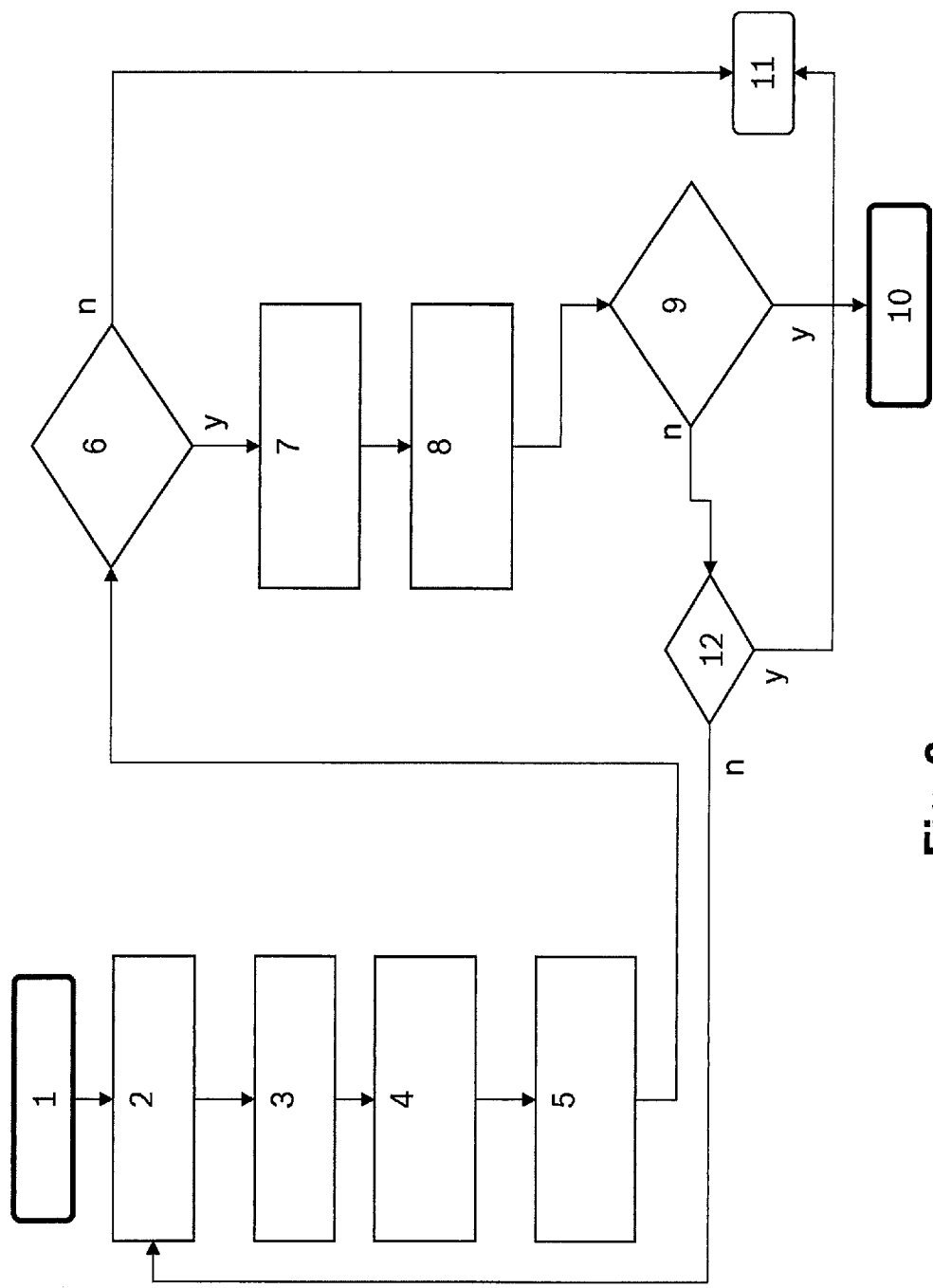
FIG. 2 shows a flow chart for one exemplary embodiment of the method according to the present invention.

The master bus user requests all slave bus users to report on the bus at their assigned address in step 2 in FIG. 2. If there were already bus users with assigned addresses, these would report in subsequent step 3. However, since no bus user has yet been assigned an address, none of the slave bus users reports. Therefore, in this example no communication between the control units in question takes place in step 3. This step will be of interest in the second exemplary embodiment.

The bus users take preparatory measures in step 4 in FIG. 2 for avoiding collisions in the subsequent bus communication. There are various options in this regard. For example, via a suitable instruction the master may specify a time range having time windows in which the slaves may request the master to allocate an address. This may be 1000 time windows, for example, each lasting one millisecond. However, the number and length of the time windows may also be selected differently, for example as a function of the number of expected bus users and/or the addresses available for the allocation.

Figure 3:
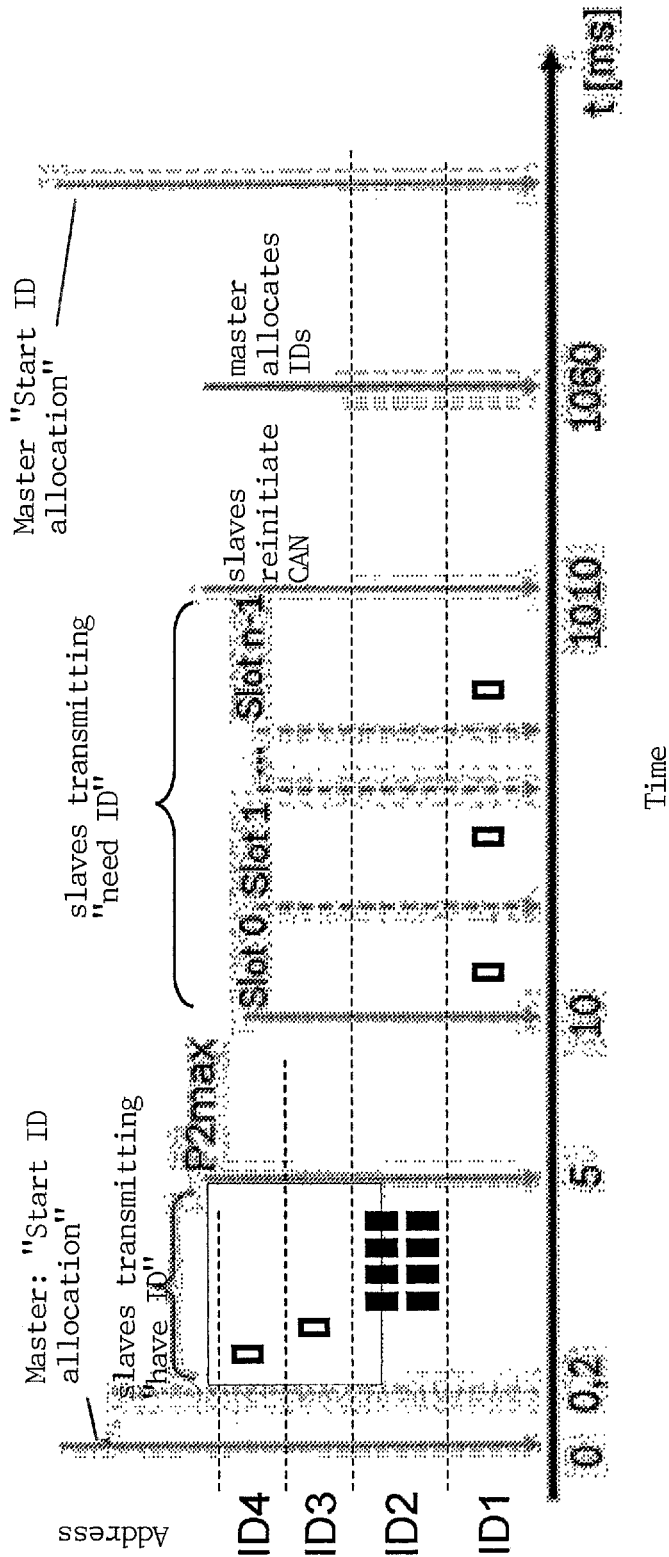
FIG. 3 shows an example of a time diagram for minimizing collisions according to the present invention via randomly selected transmission times.

The slaves respond in step 5 in FIG. 2 by randomly selecting one of the provided time windows and transmitting their serial number to the master in this window at a fixed address. This case is schematically illustrated in FIG. 3. Between the points in time denoted by "slot 0" and "slot n−1", i.e., in a time range between 10 milliseconds and 1010 milliseconds after the allocation procedure begins, the slaves request an address allocation at a random point in time selected by the slaves. In the illustrated example, the slaves transmit the request message together with their serial number at the address ID1.

In step 6 in FIG. 2, a check is made as to whether the expected number of slaves has reported. If this is not the case, i.e., if too few or too many slaves have reported, the master goes into an error state 11 and starts an error correction.

If the expected number of slaves has reported and the particular serial number has been transmitted to the master, the master allots an address to each of the requesting slaves in subsequent step 7 in FIG. 2. The allotment of the address to the slave is provided in a message having a fixed address. The message contains the serial number as well as the assigned address, so that each slave may select the address intended for it based on the serial number.

In addition, the slave enters the allocated address together with an associated identifier, for example the serial number, into a list. Other pieces of information may also be entered into the list.

In subsequent step 8 in FIG. 2, the slaves are configured in such a way that they subsequently use their assigned addresses for the communication on the bus. The slaves subsequently transmit at least one acknowledgment message at their new address in order to signal that they have completed the preparations for the bus communication.

In step 9 in FIG. 2, the master checks whether the expected number of slaves has transmitted an acknowledgment. Optionally, the master also checks whether each slave has transmitted at the correct address. For this purpose, the master uses the assignment list which it maintains. If the result of the check corresponds to the expectation, the master transmits a start instruction for normal bus operation in step 10, and the bus network transitions into normal bus operation. If there are still too few slaves, the method starts again with step 2. If too many slaves have reported, the system goes into an error state, denoted by reference numeral 11 in the figure.

As the second exemplary embodiment, the case is considered that at the beginning, one or multiple slaves already have an address that has been assigned to it/them by the master. During normal operation, control units 110, 120, 130, 140 in FIG. 1 which take part in the method communicate via a standard CAN protocol with 11-bit addressing, and are set up for the address allocation process via suitable programming which has been developed specifically for the method. The sequence of the method according to the present invention may also be explained for this example with reference to FIG. 2.

As the result of a suitable programming or configuration, master bus user 110 knows the number of slaves that are to take part in the communication. In addition, the master bus user maintains a list of serial numbers and addresses, in which it at least enters which addresses it has assigned to the various slaves.

The master bus user requests all slave bus users to report on the bus at their assigned address in step 2 in FIG. 2. Those slaves on the bus which have already been assigned an address, for example in a preceding pass of the method in the same or some other comparable bus system, in step 3 transmit a message to the master at the address assigned to them, the message containing the particular serial number as content.

The bus users take preparatory measures in step 4 in FIG. 2 for avoiding collisions in the subsequent bus communication. Via a suitable instruction, the master switches the bus users over to the extended mode of the CAN protocol with 29-bit addressing. The slaves respond in step 5 by using their serial number as an address for subsequently transmitting their serial number to the master. For the case that the 29 bits of the extended mode of the CAN protocol are not sufficient for mapping the serial number, the master may divide the range of the possible serial numbers into multiple ranges. For example, the master may initially request all slaves having an even serial number, and subsequently, all slaves having an odd serial number, to transmit. In forming the address, the slaves omit the last bit of the serial number. In this way, a range of serial numbers composed of 30 bits could be covered. Similarly, even larger ranges of serial numbers may be successively covered by appropriate masking.

In step 6 in FIG. 2 a check is made as to whether the expected number of slaves has reported. If this is not the case, i.e., if too few or too many slaves have reported, the master goes into an error state 11 and starts an error correction. A check is also made as to whether each slave has reported at the correct address, i.e., those slaves already having an assigned address have reported at the assigned address, and the other slaves have reported at the address provided in the selected allocation process. If this is not the case, an error correction in error state 11 is likewise started.

If the expected number of slaves has reported and transmitted the particular serial number to the master, the master allots to each of the requesting slaves an address in subsequent step 7 in FIG. 2. In this regard, the method may be designed in such a way that only those slaves which previously have not been assigned an address receive an address. However, a completely new distribution of the addresses may be carried out, in which the slaves which had reported at an assigned address in step 2 also receive a new address. The allotment of the address to the slave is provided in a message having a fixed address. The message contains the serial number as well as the assigned address, so that each slave may select the address intended for it based on the serial number. In addition, the slave enters the allocated address together with an associated identifier, for example the serial number, into a list.

In subsequent step 8 in FIG. 2, the slaves are configured in such a way that they subsequently use their assigned addresses for the communication on the bus. In addition, a switch is made back to standard CAN communication with 11-bit addressing. The slaves subsequently transmit an acknowledgment message at their new address.

In step 9 in FIG. 2, the master checks whether the expected number of slaves has transmitted an acknowledgment. Optionally, the master also checks whether each slave has transmitted at the correct address. For this purpose, the master uses the assignment list which it maintains. If the result of the check corresponds to the expectation, the master transmits a start instruction for normal bus operation in step 10, and the bus network transitions into normal bus operation. If there are still too few slaves, the method starts again with step 2. If too many slaves have reported, the system goes into an error state, denoted by reference numeral 11 in the figure.

A special case of the second exemplary embodiment is that only one new slave, for example a replacement part due to a failure, has been newly connected to the bus. In this case, the slaves respond to the query by the master in step 2 by transmitting, in step 3, a message including their serial number to the master at their assigned address. The master counts the number of acknowledgments, optionally comparing the received messages to its list, and otherwise carries out the procedure as described above. This check may take place directly after step 3, or also only after acknowledgment by the new slave without an assigned address, in step 6, as illustrated in FIG. 2.

FIG. 3 illustrates the time sequence of the allocation process with provided time slots, which has already been described above in conjunction with step 4 in FIG. 2. Different addresses are vertically plotted, and the time axis extends to the right. For more detailed explanation, the case is illustrated that during the method a slave has an address which has not been assigned to it by the master; in the illustrated case, this is address ID2. This case may occur, for example, if the slave was previously used in another bus. It is then possible that the address of the slave in question has already been allocated by the master to another bus user, thus resulting in collisions during transmission of the serial numbers in step 3 in FIG. 2. In the illustrated example, this is the case in the time range between 0.2 milliseconds and 5 milliseconds. The colliding messages are thus recognizable in that they are depicted as being filled in.

Alternatively, it is also possible for collisions to occur in step 5 due to coincidentally identical transmission times or coincidentally identical transmission addresses derived from the serial number.

In the illustrated case, there is an abort criterion for step 3 which causes termination after four transmission attempts. A suitable error correction must be initiated which results in a reallocation of addresses at least for the control units having colliding addresses.

Figure 4:
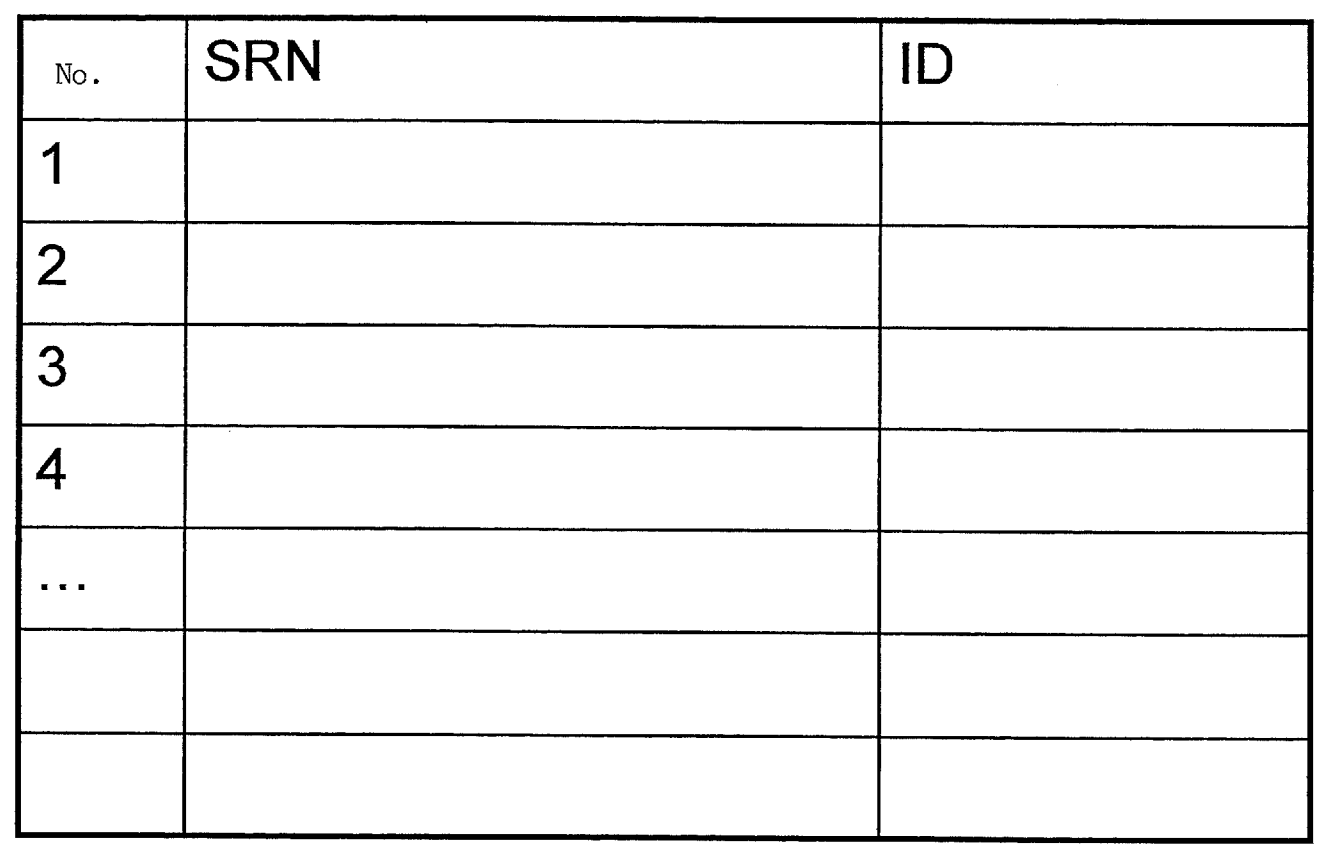

FIG. 4 illustrates the assignment table of the master, which has already been described several times. Even if no collisions occur, but a slave has an address which has not been assigned to it by the master, the master may determine this during the comparison in step 6, using the table, and may initiate a suitable error correction.

In addition, an error correction is initiated if the method has not resulted in success after a predefined number of iterations, for example because a slave is permanently nonfunctional, too many slaves are present on the bus, or the message of the master is not received by all slaves. In this case, some or all control units in question may be reset as an error correction; however, switch-off with appropriate error memory entry may be practical.

What is claimed is:

1. A method for allocating addresses in a communication bus system having at least one master bus user and slave bus users, comprising:
    initiating, by the master bus user, an address allocation via a query message sent to all bus users;
    responding, by each slave bus user which has already been assigned an address, to the query message by transmitting a message at the assigned address;
    responding, by each slave bus user which has not yet been assigned an address, to the query message by (i) enabling transmission on the bus without collisions, and (ii) transmitting a serial number of the slave bus user to the master bus user, wherein all bits of the serial number are sent in a single transmission in response to the query;
    assigning, by the master bus user, an address to each slave bus user which has not yet been assigned an address after receipt of the serial number, wherein the assigned address is used for further communication on the bus; and
    recognizing, by the master bus user, when all slave bus users have successfully been assigned an address.

2. The method as recited in claim 1, wherein the measures taken by the slave bus user to enable transmission on the bus without collisions include one of (i) the use of the serial number as a temporary address or (ii) a derivation of a temporary address from the serial number.

3. The method as recited in claim 2, wherein the CAN bus protocol is used on the communication bus system, and wherein the measures taken by the slave bus users to enable transmission on the bus without collisions include the use of extended 29-bit CAN identifiers by the slave bus users which have not yet been assigned an address.

4. The method as recited in claim 2, wherein a value range of the serial numbers is reduced to an available range of temporary addresses by masking, and a full range of the serial numbers is covered by successive masking.

5. The method as recited in claim 1, wherein the measures taken by the slave bus user to enable transmission on the bus without collisions include ascertaining, based on a number which is selected at least approximately randomly, an individual transmission time within a predefined time range.

6. The method as recited in claim 5, wherein the predefined time range of possible individual transmission times is specified by the master bus user.

7. The method as recited in claim 6, wherein the predefined time range of possible individual transmission times is adapted as a function of the number of slave bus users which have not yet been assigned an address.

8. The method as recited in claim 7, wherein one of a transport protocol or a diagnostic protocol is used, at least in part, for controlling the address allocation process on the bus.

9. The method as recited in claim 8, wherein mechanisms based on the UDS standard are used, at least in part, for controlling the address allocation process.

10. The method as recited in claim 7, wherein a piece of information concerning the number of existing slave bus users is present in the master bus user for recognizing the successful allocation of addresses to all slave bus users.

11. The method as recited in claim 7, wherein a list of serial numbers and associated allocated addresses is present and updated in the master bus user for recognizing the successful allocation of addresses to all slave bus users.

12. The method as recited in claim 10, wherein after the master bus user has recognized a successful completion of the allocation of addresses to the bus users, the master bus user starts a bus communication according to the CAN standard.

13. The method as recited in claim 7, wherein if the master bus user has not recognized a successful completion of the allocation of addresses to all the bus users, the method is repeated, and after carrying out a predefined number of iterations the method is terminated and an error is signaled.

14. A control unit for use in a master bus user in a CAN network additionally having slave bus users, comprising:
    means for initiating an address allocation via a query message sent to all bus users;
    wherein each slave bus user which has already been assigned an address responds to the query message by transmitting a message at the assigned address, and wherein each slave bus user which has not yet been assigned an address responds to the query message by (i) enabling transmission on the bus without collisions, and (ii) transmitting a serial number of the slave bus user to the master bus user, wherein all bits of the serial number are sent in a single transmission in response to the query;
    means for assigning an address to each slave bus user which has not yet been assigned an address after receipt of the serial number, wherein the assigned address is used for further communication on the bus; and
    means for recognizing when all slave bus users have successfully been assigned an address.

15. A control unit for use in a slave bus user in a CAN network additionally having a master bus user, wherein the master bus user initiates an address allocation via a query message sent to all bus users, the control unit comprising:
    means for responding, if the slave bus user has already been assigned an address, to the query message by transmitting a message at the assigned address; and
    means for responding, if the slave bus user has not yet been assigned an address, to the query message by (i) enabling transmission on the bus without collisions, and (ii) transmitting a serial number of the slave bus user to the master bus user, wherein all bits of the serial number are sent in a single transmission in response to the query;
    wherein after receipt of the serial number, the master bus user assigns an address to the slave bus user which has not yet been assigned an address, and wherein the assigned address is used for further communication on the bus, and wherein the master bus user recognizes when the slave bus user has been successfully assigned an address.

* * * * *